United States Patent [19]
Sherif

[11] Patent Number: 5,459,722
[45] Date of Patent: Oct. 17, 1995

[54] ASYNCHRONOUS TRANSFER MODE (ATM) TRANSPORT OF VOICE-BAND SIGNALS

[75] Inventor: Mostafa H. Sherif, Tinton Falls, N.J.

[73] Assignee: AT&T Ipm Corp., Coral Gables, Fla.

[21] Appl. No.: 268,600

[22] Filed: Jun. 30, 1994

[51] Int. Cl.$^6$ .................................................. H04L 12/66
[52] U.S. Cl. .................. 370/60.1; 370/79; 370/85.13; 370/94.2; 370/110.1
[58] Field of Search .................................. 370/79, 85.13, 370/60.1, 60, 94.1, 110.1, 94.2

[56] References Cited

U.S. PATENT DOCUMENTS

| | | | |
|---|---|---|---|
| 5,204,857 | 4/1993 | Obara | 370/60 |
| 5,220,563 | 6/1993 | Grenot et al. | 370/94.1 |
| 5,239,544 | 8/1993 | Balzano et al. | 370/60.1 X |
| 5,301,189 | 4/1994 | Schmidt et al. | 370/60.1 |

OTHER PUBLICATIONS

Sherif M. H., Malaret—Collazo A., and Gruensfelder, M. C., "Wideband Packet Technology in the Integrated Access and Cross-Connect System", *International Journal of Satellite Communications*, 1990, vol. 8, pp. 437–444.
The International Telegraph and Telephone Consultative Committee (CCITT), "Physical/Electrical Characteristics of Hierarchical Digital Interfaces", Recommendation G.703.
The International Telegraph and Telephone Consultative Committee (CCITT), "Synchronous Frame Structures Used at Primary and Secondary Hierarchical Levels", Recommendation G.704.
The International Telegraph and Telephone Consultative Committee (CCITT), "Voice Packetization–Packetized Voice Protocols", Recommendation G.764.

*Primary Examiner*—Douglas W. Olms
*Assistant Examiner*—Russell W. Blum
*Attorney, Agent, or Firm*—Mark K. Young; Eugene S. Indyk

[57] ABSTRACT

A plurality of ATM networks may be interconnected to allow communication of voice-band signals between them by using one or more PSTNs and a novel interface that converts ATM formatted data packets to a format usable by digital multiplication equipment (DCME). Such an interface thus allows the DCME to advantageously function as a gateway between the ATM network and PSTN by providing for optimum bandwidth usage between the networks. In an illustrative example of the invention, a DCME available from AT&T as the Integrated Access and Cross Connect System ("IACS"), is provided with an ATM-to-DCME interface that converts ATM formatted packets to a regular channelized bitstream usable as an input by the IACS. The interface and the IACS are positioned on both ends of a PSTN to allow for connectivity between the PSTN and a plurality of ATM networks, as well as the required optimization of bandwidth usage. In another illustrative example of the invention, the functionality of the interface is built in to the IACS to convert ATM formatted packets directly into efficient wideband formatted packets for transmission over the PSTN.

16 Claims, 5 Drawing Sheets

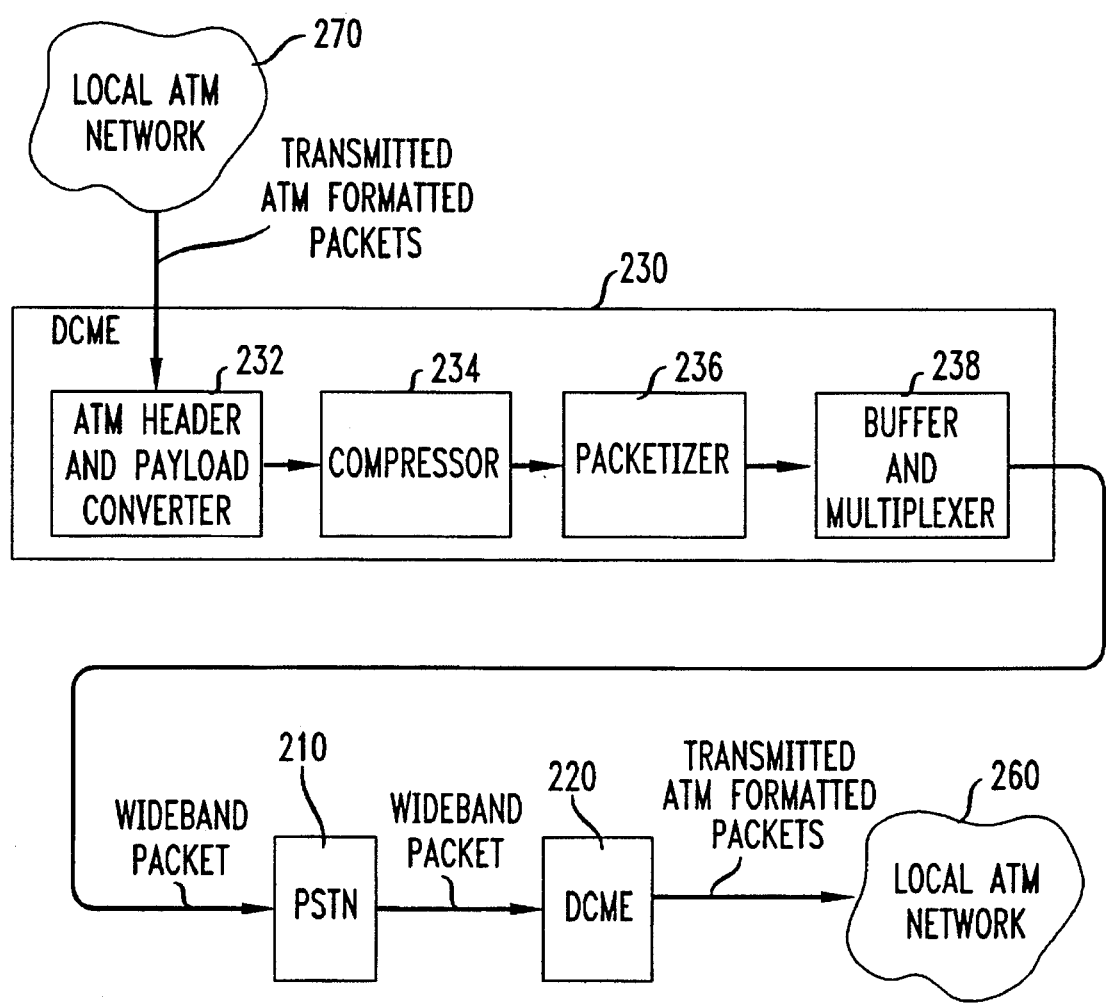

FIG. 7

| | | |
|---|---|---|
| ADDRESS (UPPER SUBFIELD) | 0 0 | OCTET 1 |
| ADDRESS (LOWER SUBFIELD) | 1 | OCTET 2 |
| UI CONTROL FIELD<br>0 0 0 P 0 0 1 1 | | OCTET 3 |
| PROTOCOL DISCRIMINATOR<br>0 1 0 0 0 1 0 0 | | OCTET 4 |
| BLOCK DROPPING INDICATOR<br>R R 0 0 R R 0 0 | | OCTET 5 |
| TIME STAMP | | OCTET 6 |
| 0/M | R R R R R R N/A | OCTET 7 |
| SEQUENCE NUMBER | A B C D | OCTET 8 |
| CHECK SEQUENCE<br>2 OCTETS | | |

M = MORE BIT
P = POLL BIT = 0
R = RESERVED FOR FUTURE USE

ASYNCHRONOUS TRANSFER MODE (ATM) TRANSPORT OF VOICE-BAND SIGNALS

TECHNICAL FIELD

This invention relates to telecommunications. More specifically, this invention relates to the transport of voice-band signals on asynchronous transfer mode (ATM) networks.

BACKGROUND

The asynchronous transfer mode (ATM) environment is now widely recognized as the preferred way of implementing Broadband Integrated Services Digital Network (B-ISDN) multiservice networks for simultaneously carrying voice, data, facsimile, and video on the network. ATM networks transmit signals in short, fixed-size packets of information. ATM networks, by virtue of being packet-based, can exploit the bursty nature of voice, data, facsimile, and video to multiplex packets from many sources so that transmission bandwidth and switching resources are efficiently shared.

The initial implementation of ATM networks will likely take the form of small, local networks or "islands." In each local ATM network, it is expected that bandwidth will be relatively abundant. Packet losses and bit errors due to traffic congestion will be rare because some form of congestion control will be in effect. Voice-band signals will likely be transported on ATM networks as a continuous stream of pulse code modulated bits (PCM) at 64 kilobits per second. No digital speech interpolation will be used to remove periods of silence in the voice-band signal. Compression of voice-band signals would also be unnecessary under the PCM transport scheme because of the minimal bandwidth limitations.

Since it is unlikely that ATM can be implemented in all locations simultaneously, it would be desirable to interconnect the various local ATM networks, located in different geographic regions and in different countries, using existing telephone networks. In most existing public switched telephone networks (PSTNs), bit errors and congestion are common due to bandwidth limitations on the PSTN. Unfortunately, the combination of congestion control, PCM transport, and continuous bitstream means that ATM networks cannot be efficiently implemented in a bandwidth-limited environment. Therefore, to achieve connection between an ATM network and a PSTN, some way of optimizing bandwidth usage between these networks would be desirable.

SUMMARY

A plurality of ATM networks may be interconnected to allow communication of voice-band signals between them by using one or more PSTNs and a novel interface that converts ATM formatted data packets to a format usable by digital multiplication equipment (DCME). Such an interface thus allows the DCME to advantageously function as a gateway between the ATM network and PSTN by providing for optimum bandwidth usage between the networks.

In an illustrative example of the invention, a DCME available from AT&T as the Integrated Access and Cross Connect System ("IACS"), is provided with an ATM-to-DCME interface that converts ATM formatted packets to a regular channelized bitstream usable as an input by the IACS. The interface and the IACS are positioned on both ends of a PSTN to allow for connectivity between the PSTN and a plurality of ATM networks, as well as the required optimization of bandwidth usage. In another illustrative example of the invention, the functionality of the interface is built in to the IACS to convert ATM is formatted packets directly into efficient wideband formatted packets for transmission over the PSTN.

The discussion in this Summary and the following Brief Description of the Drawings, Detailed Description, and drawings merely represents examples of this invention and is not to be considered in any way a limitation on the scope of the exclusionary rights conferred by a patent which may issue from this application. The scope of such exclusionary rights is set forth in the claims at the end of this application.

BRIEF DESCRIPTION OF THE DRAWINGS

FIG. 5 illustrates the block dropping indicator of an ATM voice frame.

FIG. 6 is a simplified block diagram of another illustrative example of a wide area ATM network, in accordance with the invention.

FIG. 7 illustrates the signaling frame of an ATM packet.

DETAILED DESCRIPTION

Figure 1:
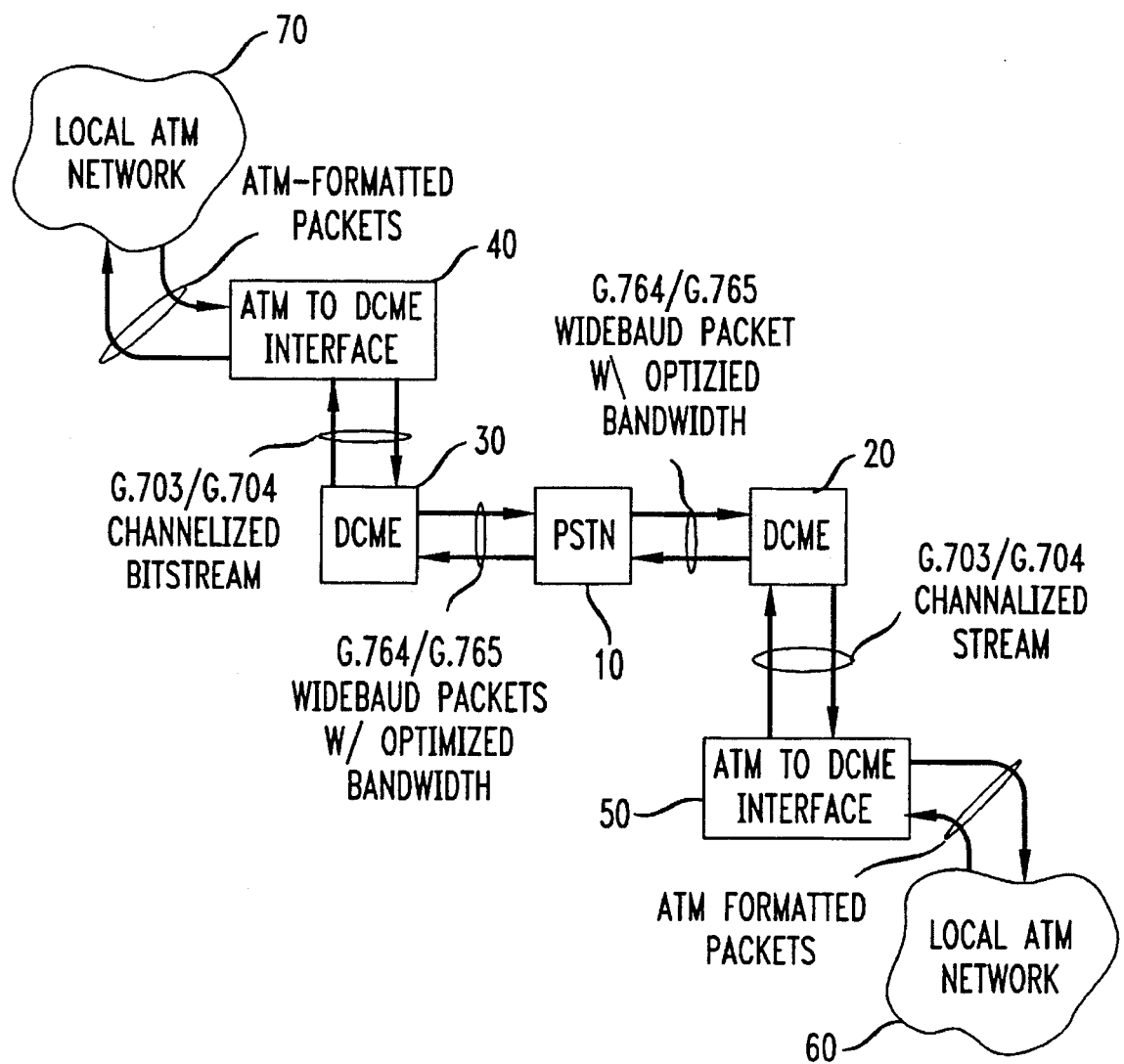
FIG. 1 is a simplified block diagram of an illustrative example of a wide area ATM network, in accordance with the invention.

Voice services have been traditionally implemented in wide area public switched telephone networks ("PSTNs") using a circuit-oriented approach. More recently, digital circuit multiplication equipment ("DCME") has been introduced to multiply the number of voice telephony circuits on public switched telephone networks ("PSTNs") by a factor of 4:1 or more through the use of digital time-assigned speech interpolation principles and low-rate encoding on bearer channels using 32 kb/s adaptive differential pulse code modulated ("ADPCM") signals. DCMEs typically use either circuit or packet-based approaches, or a combination of both, to achieve this circuit multiplication. Through successive evolution, such as the utilization of DCMEs, PSTNs have developed to the point where substantially full connectivity with the entire world has been realized. However, in the PSTN environment, transmission bandwidth still remains both limited and expensive.

Other forms of wide-area networks ("WANs") have been developed using a dynamic time division multiplexing, better known as a packet switching, approach to the transport of voice-band signals. Such WANs may be implemented as separate private networks or integrated with existing PSTNs to form hybrid circuit/packet-switched networks. Packetized systems exploit the bursty nature of voice and data signals to multiplex the traffic of several users so that transmission bandwidth and switching resources can be shared. Two parameters can be typically varied in such an approach: packet length, and time between packets. In some packet-switching schemes both parameters are varied. In the emerging asynchronous transfer mode ("ATM") packet-switched environment, the packet length is fixed and only the time between transmitted packets is varied. This simplification should reduce bandwidth expense, allowing for easier, less expensive, hardware implementation and improved system robustness.

Wide-area ATM networks ("ATM WANs") will likely come, at least in the first stages, by linking private local "islands" of ATM activity where bandwidth and switching equipment are inexpensive. As these private local islands develop, demand for wide area connectivity with other local ATM networks will grow. I have determined that such wide area connectivity between separate local ATM networks may be achieved by connecting a plurality of ATM networks to at least one PSTN using a DCME, modified with an appropriate interface, as a gateway between the ATM networks and the PSTN. The interface modification may be implemented internally or externally to the DCME.

The practice of the invention facilitates implementation of ATM WANs because no changes need to be made at the local ATM in order to accommodate the connection with other local networks—all of the necessary adjustments can occur at the modified DCME gateway. For example, congestion control is required in the PSTN environment because of the aforementioned bandwidth limitations. However, the local ATM network would not need to be equipped with congestion control—which would add inefficiency to the internal operation of the local ATM network—because the congestion control is implemented in the modified DCME gateway.

FIG. 1 is a simplified block diagram of an ATM WAN in accordance with the invention. PSTN 10 is a typical digital switched telephone network of a type that are known in the art. DCME 20 and DCME 30 are connected on either end of PSTN 10 and transmit to, and receive voice-band communication signals from, PSTN 10. DCMEs 20 and 30, are each, for purposes of this example but not as a limitation on the invention, Integrated Access and Cross-Connect Systems (IACs), commercially available from AT&T. IACs are described in M. H. Sherif, A. D. Malaret-Collazo, and M. C. Gruensfelder "Wideband Packet Technology in the Integrated Access and Cross-Connect System," International Journal of Satellite Communications, Vol. 8, No. 6, 1990. Those skilled in the art will appreciate that voice-band signals may include, for example, speech, modem, and facsimile transmissions.

Local ATM network 70 transmits to, and receives voice-band communications signals from, DCME 30 via ATM-to-DCME interface 40. Similarly, local ATM network 80 is connected to DCME 20 via ATM-to-DCME interface 50. DCME 30 and ATM-to-DCME interface 40 together comprise gateway 45. DCME 20 and ATM-to-DCME interface 50 comprise gateway 55. Local ATM networks 70 and 80 may be, for example, any network of the type conforming to Comité Consultatif International Télégraphique et Téléphonique ("CCITT") Draft Recommendation I.113, Section 2.2, 1990. Although FIG. 1 shows two local ATM networks and a single PSTN for purposes of clarity in illustration, those skilled in the art will appreciate that the principles described herein may be applied to any number of local ATM networks and PSTNs. For purposes of the following discussion, local ATM network 70, ATM-to-DCME interface 40 and DCME 30 are deemed positioned on the originating endpoint of the ATM WAN. Local ATM network 80, ATM-to-DCME interface 50 and DCME 20 are deemed positioned on the terminating endpoint of the ATM WAN. Of course, those skilled in the art will appreciate that communications signals travel in both directions on the ATM WAN, thus, the designation of any one endpoint as originating or terminating is arbitrary.

Figure 2:
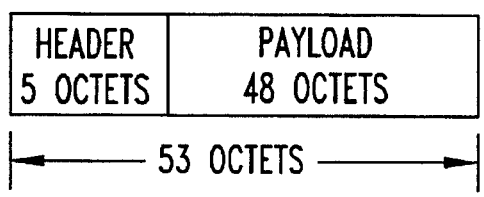
FIG. 2 is a general diagram of an ATM packet.
Figure 3:
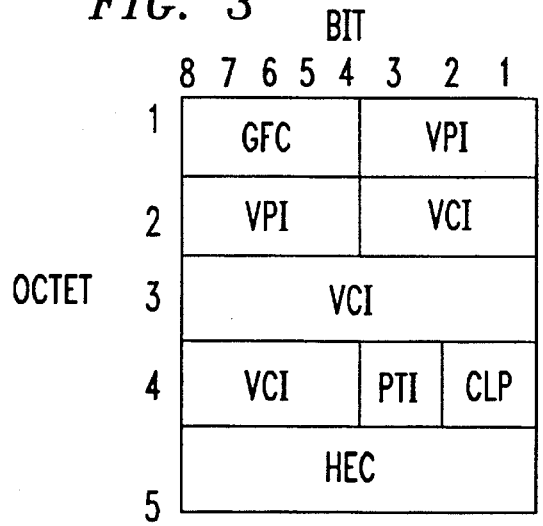
FIG. 3 shows details of an ATM packet header.

It is helpful, at this point, to review some information related to ATM packets. The general outline of an ATM packet is shown in FIG. 2. An ATM packet occupies 53 octets, consisting of a 5 octet header and a 48 octet payload. In FIG. 3, the details of the 5 octet header are depicted. The header consists of the following fields:

CLP Cell Loss Priority

GFC Generic Flow Control

HEC Header Error Control

PTI Payload Type Identifier

VCI Virtual Channel Identifier

VPI Virtual Path Identifier

Not all these fields have yet been standardized, therefore, the conversion scheme described herein will depend on certain assumptions. Those skilled in the art will appreciate that such assumptions could be readily changed to accommodate any changes in the standard as it becomes more complete. In addition, the payload format for voice-band signals is still under debate at this time. However, a leading candidate has a payload with fields arranged as shown in FIG. 5. For purposes of this example, it is assumed that the sequence number field consists of the following three subfields:

Subfield 1. 1-bit convergence layer indicator. This subfield may be used, for example, to synchronize the clock of the transmitters at both the originating and terminating endpoints of the ATM WAN.

Subfield 2. 3-bit sequence number.

Subfield 3. 4-bit error detection and correction for the sequence number.

The remaining 47 octets of the payload contain the voice-band PCM samples of single virtual channels. These PCM channels could, for example, represent speech, voice-band data, facsimile, PSTN videophone signals or any other voice-band traffic.

Returning back to FIG. 1, in operation, local ATM 70 transmits a voice-band signal in the form of ATM-formatted packets to ATM-to-DCME interface 40 which depacketizes and converts the signal into a regular channelized bitstream in a format conforming to CCITT recommendation G.703/G.704. The conversion of the format from ATM to G.703/G.704 may be accomplished using a conventional method. However, ATM-to-DCME interface 40 must perform other tasks, in accordance with the principles of the invention, in order to fully implement the gateway function between local ATM network 70 and PSTN 10. First, ATM-to-DCME interface 40 checks the cyclic redundancy check (CRC) bits in each,packet in the incoming signal. If a CRC check of the ATM packet indicates that the ATM packet is valid, then a validity indication signal is generated and ATM-to-DCME interface 40 extracts the payload from the ATM packet and performs the conversion to G.703/G.704 format in response to the validity indication signal. If the check indicates that the ATM packet is invalid then ATM-to-DCME interface 40 will either drop the packet, or will transmit silence or idle codes to DCME 30. Next, the 3-bit sequence number subfield and the 1-bit convergence sublayer indicator subfield in the sequence number field in the payload of the incoming ATM packet, are transmitted by ATM-to-DCME interface 40 to DCME 30 in any appropriate format for use in a signaling frame, for example, a signaling frame as defined by CCITT recommendation G.764. To accomplish this, one channel between ATM-to-DCME interface 40 and DCME 30 must be reserved for transmission of this signaling frame. An example of a signaling frame conforming to CCITT G.764 is shown in FIG. 7.

The G.703/G.704 signal is then transmitted to DCME 30 from ATM-to-DCME interface 40 where it is repacketized into highly bandwidth-efficient wideband packets conforming to CCITT recommendation G.764/T.312 for voice-band signals. The G.764/T.312 signal from DCME 30 is then transmitted over PTSN 10 in a conventional manner. DCME 20 receives the wideband packetized G.764/T.312 signal from PSTN 10 where it depacketizes and converts the signal into regular channelized bitstream in a format conforming to CCITT recommendation G.703/G.704 and outputs it to ATMDCME interface 50. ATM-to-DCME interface 50 packetizes and converts the G.703/G.704 signal into an ATM formatted signal where it is then transmitted to local ATM network 60. Voice-band signals are transmitted from local ATM network 60 to local ATM network 70 in a similar manner as described above, but in the opposite direction, thereby implementing an ATM WAN having two-way communication.

Advantageously, DCMEs 20 and 30, in combination with ATM-DCME interfaces 40 and 50, respectively, function as gateways between the local ATM networks and the PSTN by permitting efficient use of the scarce bearer bandwidth in PSTN 10 through ADPCM coding and statistical multiplexing. Moreover, as it is known that the packet header in the wideband packetized G.764/T.312 signal includes all required routing and control information, calls may be routed to multiple destinations easily, as in conferencing and broadcasting situations.

FIG. 6 shows another illustrative example of an ATM WAN in accordance with the invention. In this illustrative example, the function of ATM-to-DCME interfaces 20 and 30 shown in FIG. 1 are incorporated into DCMEs 220 and 230, respectively, which provides for the direct conversion of ATM formatted packets from local ATM networks 260 and 270 into wideband formatted packets for transmission over PSTN 10. As above, for purposes of clarity in the discussion which follow, local ATM network and DCME 230 are deemed on the transmitting endpoint of the ATM WAN, while local ATM network 260 and DCME 220 are deemed on the terminating endpoint of the ATM WAN.

At the originating endpoint, DCME 230 converts each ATM formatted packet, with its specific VPI and VCI, directly into a corresponding packet stream with a data link connection identifier ("DLCI"), in the efficient wideband packetized G.764/T.312 format. At the terminating end, DCME 230 converts the wideband packetized G.764/T.312 signal into the ATM format with the necessary VPI and VCI. Since the VPI is an 8-bit field, it allows for 256 possible virtual channels. The VCI is a 16-bit field which allows for 65,536 possible virtual channels. This large number of channels is possible at the broadband rates. At the primary rate, the number of channels is much smaller. In either case, the number of virtual channels that are used to interconnect local ATM networks will be a small percent of the total number of channels since most of the traffic in a local ATM network will be internal to that network, rather than between separate local ATM networks. It is expected that ATM will be used first primarily to replace shared media local ATM networks with high speed hubs/switches for selected applications. This number of channels cannot exceed the total number of virtual channels in the wideband packet environment. This mapping function between the virtual channels in the local ATM network and the virtual channels in the wideband packet environment may be accomplished, for example, in several ways. For permanent virtual circuits, it can be done at provisioning time until all channels in the wideband packet network are exhausted. For switched virtual circuits, the mapping is done at call-establishment time. If all channels in the wideband packet environment are exhausted, then the call is blocked by using appropriate protocols between the DCME and the ATM switch in the local ATM network. For example, those skilled in the art will appreciate that the CCITT recommendation Q.50 protocol could be extended to cover that situation. Alternatively, enough buffer capacity to buffer the blocked traffic could be provided until capacity becomes available.

The conversion from ATM-formatted packets to G.764/T.312 involves conversion of the 5 octet ATM header and 48 octet ATM payload. This accomplished by ATM header and payload converter 232 in DCME 230. The conversion of the ATM packet header is described below. At the originating endpoint, DCME 230 examines the HEC field. If the HEC field indicates an error at the input, the packet is dropped. Otherwise, the processing of the header information continues. In addition to the address conversion indicated above, other conversion functions are also needed. The GFC field is not fully standardized. For purposes of this example, it will be assumed to be zero and DCME 220 at the terminating endpoint will reinsert zeros in the appropriate field. Once the GFC field is standardized, and if it is needed at the terminating endpoint, the values of this field can be transmitted, for example, by using the 4 reserved bits in the block dropping indicator of the voice frame shown in FIG. 5 or the signaling frame shown in FIG. 7. The PTI field coding will depend on the amount of congestion on the ATM network. Since, according to the current thinking, ATM networks transporting voice-band signals will never be congested, the value of this field will always be zero. The conversion function at the terminating endpoint will re-insert zeros at the appropriate field. A CLP field value of "1" is used to indicate that the packet can be discarded. Because voice-band signals cannot be discarded without adversely affecting the quality of the service, the CLP field value is always zero. Therefore, the conversion function at the terminating endpoint will reinsert this value in the packet header. The value does not need to be transmitted. At the terminating endpoint, DCME 220 (FIG. 6) performs the reverse functions and generates a new HEC at the output.

Figure 8:
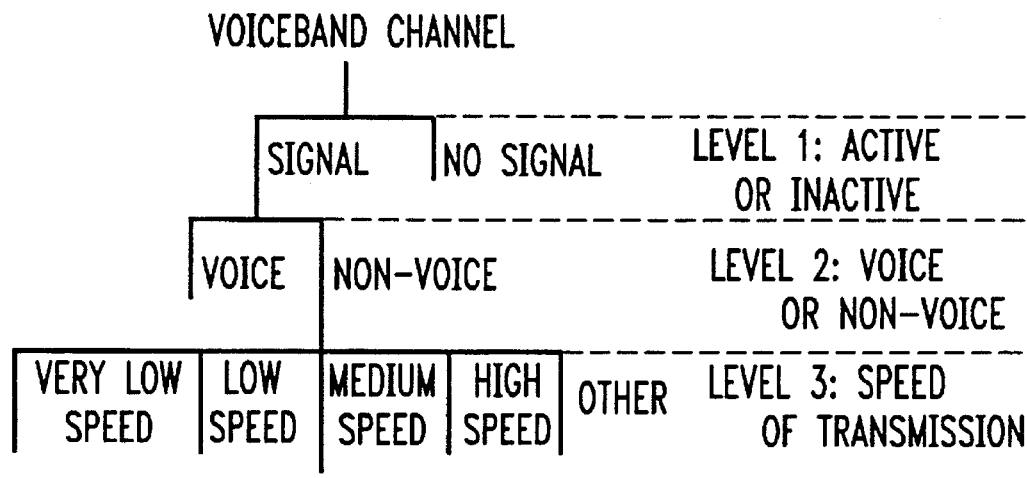
FIG. 8 is a decision tree used to determine the type of signal present in a pulse code modulated bitstream.
Figure 9:
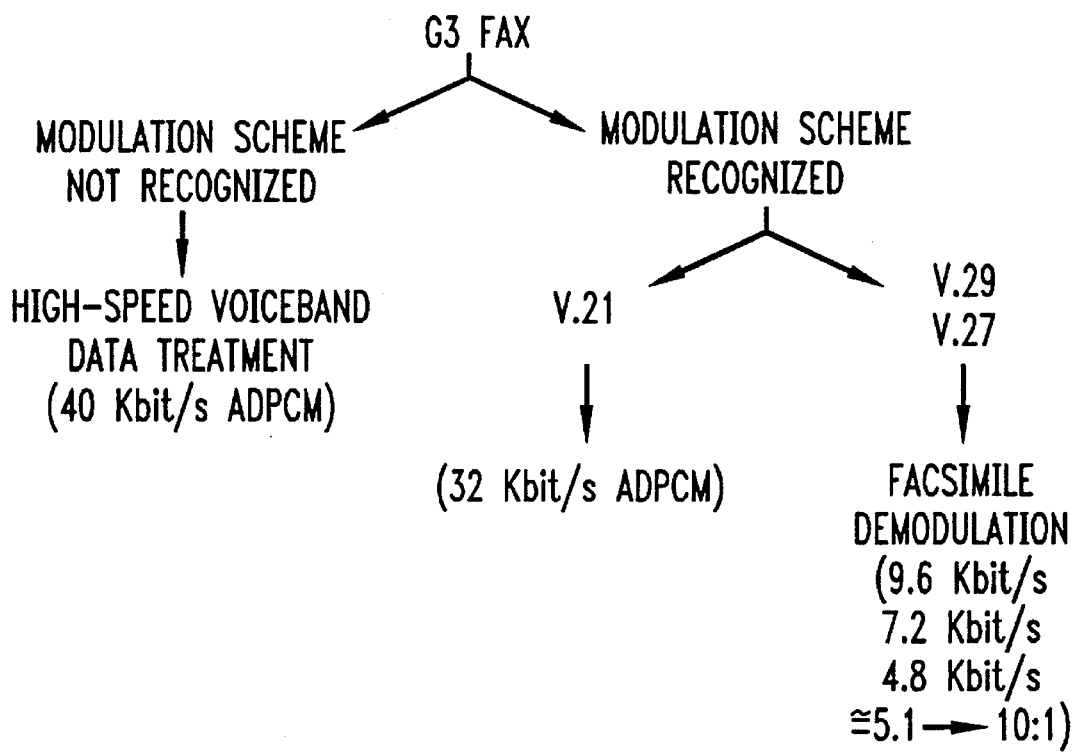
FIG. 9 is another decision tree used to determine the type of signal present in a pulse code modulated bitstream.

The ATM packet payload conversion is discussed below. At the originating endpoint, DCME 230 determines the type of signal in the PCM stream. This determination may, for example, be made in accordance with the decision trees shown in FIG. 8 and 9. FIG. 8 shows that the PCM stream is analyzed to determine if the channel is active and, if so, whether the signal is voice or other non-voice. If non-voice, then the speed of transmission is determined. For example, if the detected signal is a videophone signal then it may be compressed using CCITT recommendation G.764. FIG. 9 shows that if the PCM stream is determined to carry Group 3 facsimile traffic, then DCME 230 will treat the signal as high-speed voice-band data if the modulation scheme is not recognized, or will demodulate the signal according to the procedure of CCITT recommendation G.765 for example, to extract the facsimile image data for transmission at 9.6 kbits/s. Compressor 234, packetizer 236 and buffer/multiplexer 238 perform the required functions in a conventional manner to compress and packetize the PCM stream into wideband packets for transmission over PSTN 210.

Figure 4:
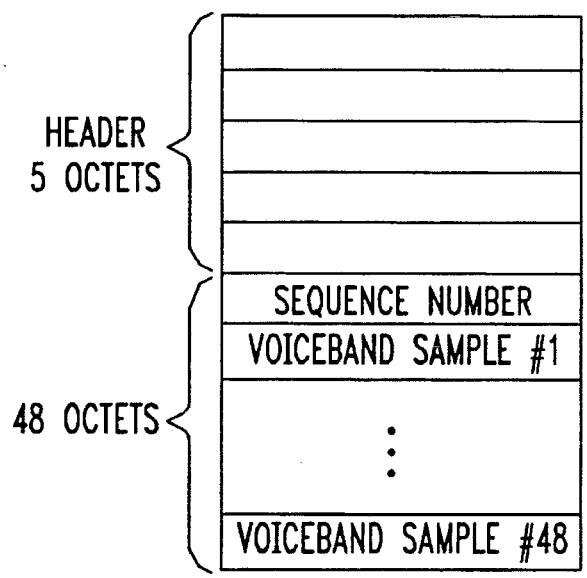
FIG. 4 is an illustrative example of a payload format for voice-band ATM packets.

At the terminating endpoint, DCME 230 retrieves the original PCM signal, formatted according to CCITT G.764/G.765, that will be put in the payload field of the ATM packet. At the originating endpoint, DCME 230 use the 4-bit error detection to ensure that the 3-bit sequence number subfield is correct before transmission. The 3-bit sequence number subfield, as well as the 1-bit for the convergence sublayer indicator subfield, are sent to the terminating endpoint, employing the signaling frame shown in FIG. 4, by using some of the reserved bits in Octet 7 of that frame. This signaling frame will be sent on a different layer 2 address than for the corresponding voice-band signal frame. It will be sent at the beginning of the circuit establishment if the sequence number of the packet arriving at the DCME from the local ATM network is not the expected number because a packet has been dropped due to an error detected by the HEC. Alternatively, the signaling frame may be sent if there is a change in the convergence sublayer indicator subfield. Otherwise, DCME 230 will not send the signaling frame and it will increase the sequence number by 1 in its internal register.

At the terminating endpoint, DCME 220 selects an appropriate sequence number to put in the ATM payload, by using either information from a signaling frame, or by increasing the sequence number automatically. 4-bit error detection and correction codes are then regenerated to reform the sequence number field with its three subfields. The ATM formatted packets are transmitted by DCME 230 to local ATM network 260. Of course, those skilled in the art will appreciate that DCME is similar in form and operation to DCME 230, and thus details of DCME 220 need not be shown or described further.

It will be understood that the particular techniques described above are only illustrative of the principles of the present invention, and that various modifications could be made by those skilled in the art without departing from the scope and spirit of the present invention, which is limited only by the claims that follow. Those skilled in the art will appreciate that the invention may be used in to connect other networks to PSTNs where bandwidth optimization is required, for example, satellite and cellular networks.

I claim:

1. An interface for use between digital circuit multiplication equipment and an ATM network, comprising:

receiving means for receiving a plurality of ATM packets from said ATM network, each ATM packet including a header and a payload;

cyclic redundancy checking means for checking cyclic redundancy bits in each of said plurality of ATM packets, and for producing a validity indication signal for each of said ATM packets;

extraction means for selectively extracting said payload from each of said plurality of ATM packets in response to said validity indication signal;

a means for converting said header and said extracted payload to a continuous bitstream; and output means for supplying as an output said continuous bitstream to said digital circuit multiplication equipment;

wherein said output means further includes generating means for generating signaling frames for transmission in a channel between said ATM network and said digital circuit multiplication equipment.

2. The interface as claimed in claim 1 wherein said signaling frames include a 3-bit sequence number and a 1-bit convergence sublayer indicator.

3. An interface for use between digital circuit multiplication equipment and an ATM network, comprising:

receiving means for receiving a plurality of ATM packets from said ATM network, each ATM packet including a header and a payload;

cyclic redundancy checking means for checking cyclic redundancy bits in each of said plurality of ATM packets, and for producing a validity indication signal for each of said ATM packets;

extraction means for selectively extracting said payload from each of said plurality of ATM packets in response to said validity indication signal;

a means for converting said header and said extracted payload to a continuous bitstream; and output means for supplying as an output said continuous bitstream to said digital circuit multiplication equipment;

wherein said output means further includes a means for selectively outputting silence to said digital circuit multiplication equipment in response to said validity indication signal.

4. An interface for use between digital circuit multiplication equipment and an ATM network, comprising:

receiving means for receiving a plurality of ATM packets from said ATM network, each ATM packet including a header and a payload;

cyclic redundancy checking means for checking cyclic redundancy bits in each of said plurality of ATM packets, and for producing a validity indication signal for each of said ATM packets;

extraction means for selectively extracting said payload from each of said plurality of ATM packets in response to said validity indication signal;

a means for converting said header and said extracted payload to a continuous bitstream; and output means for supplying as an output said continuous bitstream to said digital circuit multiplication equipment;

wherein said output means further includes a means for selectively outputting idle codes to said digital circuit multiplication equipment in response to said validity indication signal.

5. The interface of claim 1 wherein said digital circuit multiplication equipment is an Integrated Access and Cross Connect System produced by AT&T.

6. The interface of claim 1 wherein said extraction means further includes packet dropping means for selectively dropping an ATM packet in response to said validity indication signal.

7. The interface as claimed in claim 1 wherein said continuous bitstream is a bitstream conforming to CCITT recommendation G.703/G.704.

8. The interface of claim 3 wherein said digital circuit multiplication equipment is an Integrated Access and Cross Connect System produced by AT&T.

9. The interface of claim 3 wherein said extraction means further includes packet dropping means for selectively dropping an ATM packet in response to said validity indication signal.

10. The interface of claim 3 wherein said continuous bitstream is a bitstream conforming to CCITT recommendation G.703/G.704.

11. The apparatus of claim 4 wherein said digital circuit multiplication equipment is an Integrated Access arid Cross Connect System produced by AT&T.

12. The interface of claim 4 wherein said extraction means further includes packet dropping means for selectively dropping an ATM packet in response to said validity indication signal.

13. The interface of claim 4 wherein said continuous bitstream is a bitstream conforming to CCITT recommendation G.703/G.704.

14. The interface of claim 5 wherein said digital circuit multiplication equipment is an Integrated Access and Cross Connect System produced by AT&T.

15. The interface of claim 5 wherein said extraction means further includes packet dropping means for selectively dropping an ATM packet in response to said validity indication signal.

16. The interface of claim 5 wherein said continuous bitstream is a bitstream conforming to CCITT recommendation G.703/G.704.

* * * * *